United States Patent [19]

Tyler

[11] E Re. 30,857

[45] Reissued Feb. 2, 1982

[54] ROTARY DRY SHAVER WITH TILTABLE SHEAR PLATES

[75] Inventor: Tracy B. Tyler, Miami Beach, Fla.

[73] Assignee: Edwin E. Greigg, Silver Spring, Md.; a part interest

[21] Appl. No.: 695,020

[22] Filed: Jun. 11, 1976

Related U.S. Patent Documents

Reissue of:

[64] Patent No.: 3,715,803
Issued: Feb. 13, 1973
Appl. No.: 115,546
Filed: Feb. 16, 1971

U.S. Applications:

[63] Continuation of Ser. No. 528,499, Nov. 29, 1974, abandoned.

[51] Int. Cl.[3] ..... B26B 19/16

[52] U.S. Cl. ..... 30/43.5

[58] Field of Search ..... 30/34.1, 43.1, 43.5, 30/43.6, 43.4, 241, 346.51

[56] References Cited

U.S. PATENT DOCUMENTS

| | | | |
|---|---|---|---|
| 2,900,720 | 8/1959 | Starre | 30/43.5 |
| 2,952,908 | 9/1960 | Starre | 30/43.5 |
| 3,032,873 | 5/1962 | Vaes | 30/43.6 |
| 3,035,346 | 5/1962 | Campbell | 30/43.6 X |
| 3,494,031 | 2/1970 | Sklenar | 30/43.6 |
| 3,581,392 | 6/1971 | Hubner | 30/34.1 |
| 3,694,915 | 10/1972 | Beusink | 30/32 |

*Primary Examiner*—Gary L. Smith

*Attorney, Agent, or Firm*—Edwin E. Greigg

[57] ABSTRACT

A rotary dry shaver comprising a component housing, a pair of tiltable cutting elements with exposed apertured shear plates, a bladed rotary cutting member cooperative with the inner surface of the shear plates and coactively tiltable therewith, a driving shaft for the cutting members, the shear plates and cutting members normally disposed at a right angle to the shaft axes, the cutting elements independently supported axially on a spherically radiused surface whereon they are freely tiltable at diverse angles relative to the shaft axes, a removable cutting element retaining frame with apertures through which a portion of each of the cutting elements projects, the outer surface of the projecting portion correspondingly spherically radiused and fittingly and tiltably retained by and in the frame apertures, a chamber in the housing beneath said frame to receive hair clippings, apertures through the housing sidewalls communicating with the chamber, hinged side plates to open and close the wall apertures, the side plates and said frame comprising cooperative engaging portions by which the frame is positively secured in place when the side plates are closed, the shear plate apertures and the blades of the cutting member opposedly two-edged for cutting in either rotational direction, a driving motor, means for reversing the rotation of the cutting member at desired intervals, a toothed edge reciprocal hair trimming clipper embodied in the housing, the toothed edge of which may be projected from or retracted into the housing, the clipper being operably connected to a driving element when it is projected and disconnected when it is retracted.

12 Claims, 13 Drawing Figures

ROTARY DRY SHAVER WITH TILTABLE SHEAR PLATES

Matter enclosed in heavy brackets [ ] appears in the original patent but forms no part of this reissue specification; matter printed in italics indicates the additions made by reissue. *This is a Continuation, of application Ser. No. 528,499, filed November 29, 1974, now abandoned.*

BACKGROUND AND SUMMARY OF THE INVENTION

The present invention relates to improvement in a rotationally operated dry shaver of the type comprising two or more shear plates which though normally disposed at a right angle to their cutter driving shaft are tiltable at diverse angles in shaving to conform to the skin contours. It also relates to such a shaver which includes a reciprocal toothed edge hair trimming clipper, and which includes means and provisions for reversing the cutter rotation when desired.

Various rotary dry shavers have been introduced which comprise two or more apertured shear plates which are tiltable and which include a bladed rotary cutting member cooperative with the shear plates and coactively tiltable therewith, but in such previously known structures the shear plates (usually retained in a frame) are made tiltable by primarily supporting them on the cutting blades, the latter being tiltably supported on one end of an axially spring biased driving shaft under a very light pressure. However, because the apertured shearing portion of the plates must be extremely thin to effect a close shave they are consequently very fragile. Therefore, were they fully supported only on the cutter blades a relatively heavy pressure in shaving or handling could cause the blades to break through the fragile thin shell of the plate shearing portions. For this reason, when primary support on spring biased blades constitutes the structure by which the shear plates are made tiltable, a secondary and solid support must be provided on which the under portion of the shear plates come to rest after they have been depressed a preset distance together with the spring biased blades, and since the secondary support must uniformly limit the plate depression at all points they are now resting with the faces in a flat plane and no longer tiltable. This condition results even with pressure on only one radial side of the plate faces. Thus, when so depressed the shear plate faces can no longer adjust to the skin contours.

Also, heretofore rotary dry shavers with two or more tiltable shear plates have been made, as above described, with the apertures of the shear plates formed as slits which naturally present two opposite cutting edges, but no advantage has been taken of this to lengthen the cutter wear life by employing a two-edged rotary cutting member and means for reversing the cutter rotation when desired, as hereinbefore recited.

A prime object of the present invention is to provide a rotary dry shaver with tiltable nonrotating cutting elements comprising apertured shear plates, the cutting elements supported on a spherically radiused surface in such fashion that all shaving pressure is sustained on the nonrotating cutting element and none on the blades of a rotary cutting member cooperating with the inner surface of the shear plates. The plates remaining freely tiltable under all shaving pressures and conditions.

Another object is to provide in such a shaver a cutting element retaining frame having apertures through which a portion of the cutting elements project and wherein a portion of the outer surface of the latter is correspondingly spherically radiused to be fittingly and tiltably retained by and in the frame apertures.

Still another object is to provide such a shaver with means and provisions for reversing the rotation of the rotary cutting member when desired.

A further object is to provide such a shaver with a housing comprising a hair clipping receiving chamber beneath the cutting element retaining frame, chamber clean-out apertures through the housing side walls, a pair of side plates hinged to the housing to open and close the wall apertures, and cooperating engaging means on a portion of the frame and the side plates to engage together when the latter are closed to positively secure the frame in place.

A still further object is to provide such a shaver with a component housing wherein a toothed edge reciprocal hair trimming clipper is embodied, the toothed edge of which may be projected from or retracted into the housing, the clipper being operably connected to a driving element when it is projected and disconnected when retracted.

These and other objects of my invention will be apparent from the following description wherein reference is made to the accompanying drawings illustrating certain embodiments of my invention, and wherein similar numerals designate similar parts throughout the several views and Figures.

STRUCTURAL ELEMENTS

Figure 3:
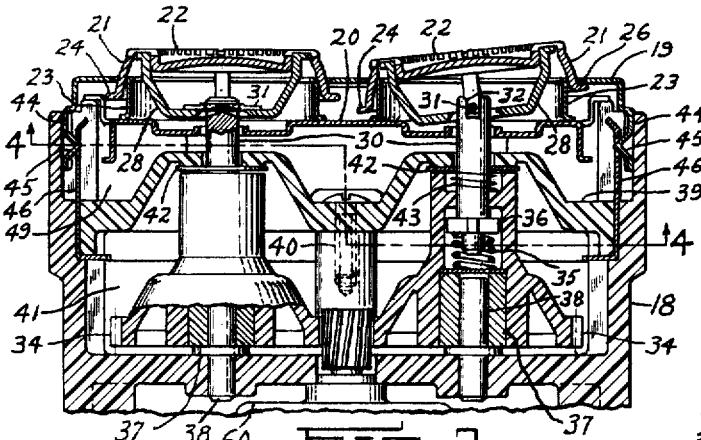
FIG. 3 is a vertical transverse sectional view taken on line 3—3 of FIG. 1 showing the tiltable spherically radiused cutting elements and their supporting members, the rotary cutting members, the hair clipping receiving chamber, and the drive shafts and driving gears.
Figure 4:
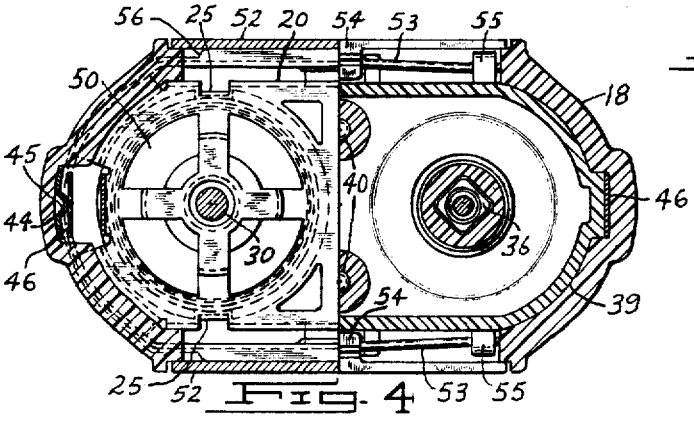
FIG. 4 is a two-plane transverse plan sectional view taken on stepped line 4—4 of FIG. 3 showing a portion of the side plate hinges, and other component elements.

Referring first to FIGS. 3 and 4, the shaver may comprise a housing 18 to which is removably affixed (by means later to be described) an externally disposed cutting element retaining frame 19 under which and associated therewith is a cutting element supporting frame 20. Disposed in a space between the frames is a pair of tiltable cutting elements 21 comprising apertured shear plates 22. The cutting elements may be cup-shaped, as shown, and the body portion thereof may be formed with a spherical radius internally and externally with a common center point. The elements are supported on their internally radiused surface on the annulus of a pair of rings 23 which, in turn, are supported on the frame 20. As is obvious, the cutting elements thus supported may be universally and freely tilted on their spherically radiused inner surface. And the rings are free for self-centering.

A radially extended flange 24 formed on the bottom edge of the cutting elements is slotted at diametrically opposite sides to loosely engage with tongues 25 (FIGS. 4 and 6) formed on supporting frame 20 to prevent the cutting elements from rotating. The flange also limits the tilt to a desired degree when it abuts the underside of frame 19, as at 26.

The frame 19 is provided with apertures through which the shear plates and a portion of the cutting elements project, the elements being fittingly and tiltably retained by and in the frame apertures encircling their externally radiused surface, which is concentric with their internal surface radius, as indicated above.

Figure 5:
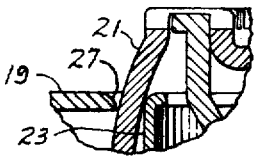
FIG. 5 is an enlarged fragmentary sectional view showing more clearly a portion of one of the cutting elements and its associated structural components.

It is to be observed that an external corner radius 27 (FIG. 5) is formed on the edge of the apertures of frame 19 encircling the projecting portion of the cutting elements. This is to prevent any hair from catching on a sharp edge in any space that might exist between the apertures and the cutting elements.

Figure 1:
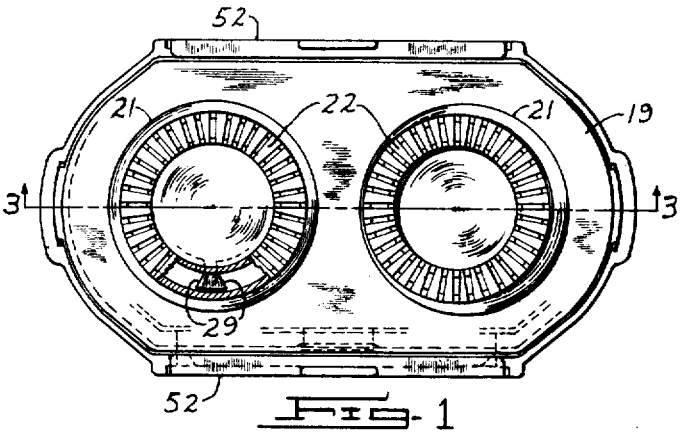
FIG. 1 is a top plan view of a preferred embodiment of the shaver showing the disposition of two cutting elements with shear plates, a portion of one shear plate broken away to show on of the two-edged cutting blades, and the element retaining frame.
Figure 9:
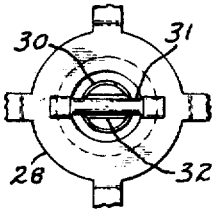
FIG. 9 is an enlarged fragmentary plan view of the center portion of one of the cutting elements showing the driving connection elements.
Figure 10:
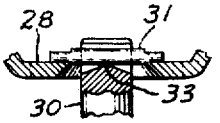
FIG. 10 is an enlarged fragmentary vertical transverse sectional view of the elements of FIG. 9.

Cooperative with the cutting elements and coactively tiltable therewith are rotary cutting members 28 comprising radially extended arms upturned at the ends and terminating in cutting blades formed with two opposed cutting edges 29 (FIG. 1) for cutting in both rotational directions by means to be later described. The cutting members are connected to driving shafts 30 by a round cross-pin 31 engaged in a slot 32 across one end of the shaft (best shown in FIGS. 9 and 10). The cutting members are tiltable at a right angle to the slot on their cross-pin, and the latter are seated on a narrow raised point 33 in the bottom of the slot at the shaft center, which allows the members to be tilted parallel to the slot, thus making them universally tiltable Cross-pins 31 may be affixed to the cutting member center plate as by contact welding the ends thereto.

The driving shafts are loosely retained in the hubs of a pair of driving gears 34. Compression springs, as 35, axially bias the shafts against the connecting elements of the cutting members 28 under a predetermined light pressure, which, in turn, biases the cutting blades into contact with the inner surface of the shear plates under a desired preset pressure. The shafts may be driven by a square 36 provided on their lower end and loosely fitted in a square chamber in the gear hubs. The gears may be provided with oil impregnated bushings 37 and journaled on studs 38 suitably secured in a partition in the housing.

Obviously, to be freely tiltable on the rings 23, as previously described, there must be a few thousandths of an inch of clearance over the wall thickness of the cutting elements 21 between the aperture edges of frame 19 and the rim of the rings 23, and when the cutting elements are not under shaving pressure they are lightly and yieldably sustained against the frame aperture edges by the blades of the cutting members responsive to the spring biasing of the latter into contact with the inner surface of the shear plates. However, the spring bias pressure to the cutting members is only the minimum required for the blades to shear effectively, so they cannot support shaving pressure. Thus, upon application of shaving pressure the cutting elements become tiltably supported firmly on the rings 23 independment of the cutting members and without augmenting the preset pressure on the shearing blades.

A capping plate 39 retained by screws 40 is fitted inside the housing and forms a closed chamber 41 in which the gears are disposed. Apertures in the plate 39, through which the shafts extend, are made somewhat larger than the shaft diameters to allow them to float radially to some extent for free alignment with the cutting members. To preclude entrance of dirt or hair clippings into the gear chamber through the oversize shaft apertures washers 42 are provided which closely fit the shafts and are rotatably sustained against the underside of the plate by very light biasing springs, as 43.

For quiet operation it is preferable to employ gearing of helical tooth type, which produces an axial driving thrust, and since the shaver is to be operated in both rotational directions, as aforementioned, the gears, as will be seen in FIG. 3, are adapted to sustain axial thrust at either axial end.

Figure 6:
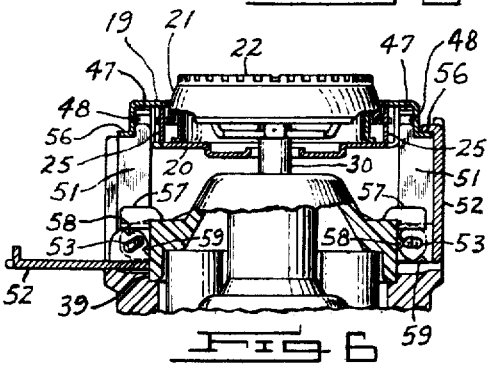
FIG. 6 is a vertical cross sectional view taken on line 6—6 of FIG. 2 showing one of the side plates open and the other closed with its frame engaging portion engaged with the frame flange.
Figure 2:
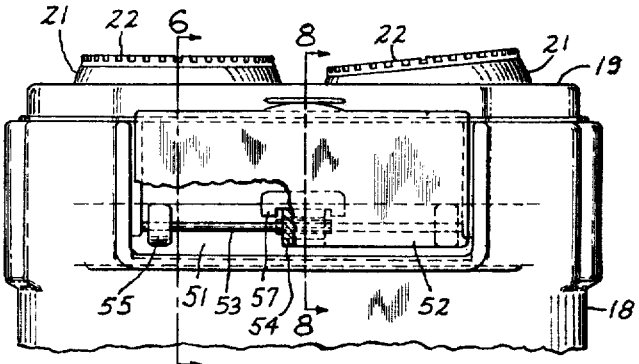
FIG. 2 is a vertical side elevation of the upper portion of the shaver showing one of the side plates with a portion broken away to show one of the wall apertures and part of a side plate hinge.
Figure 7:
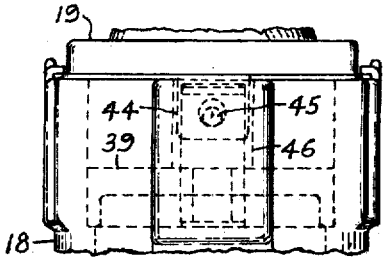
FIG. 7 is a vertical end view showing in broken lines a spring clip structure for primarily retaining the cutting element retaining frame.
Figure 8:
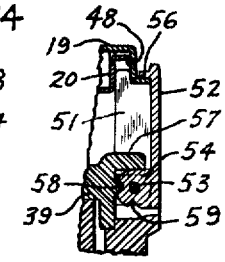
FIG. 8 is a fragmentary vertical sectional view taken on line 8—8 of FIG. 2 showing the side plate retaining hinge and the position sustaining detent means.

The retaining frame 19 is fitted to the housing top and is primarily removably retained on the housing by tongues 44 entered into recesses in the housing and comprising conical shaped projections 45 which engage in cooperating apertures in spring tabs 46 (FIGS. 2, 4 and 7). The spring tabs may be secured in the housing by the plate 39, as shown, and are biased to snap over the projection. The supporting frame 20 rests on the top edge of the housing and may be removably adjoined to the retaining frame 19 by laterally extended flanges 47 on the supporting frame which snap over projections 48 in the sides of the retaining frame (FIGS. 6 and 8).

A chamber 49 is formed between the supporting frame and the plate 39 for receiving hair clippings, which pass through apertures, as 50, in the frame. Apertures, as 51 (FIGS. 2, 4 and 6), through the side walls of the housing communicate with the chamber for disposal of the clippings or other debris without detaching the frames 19 and 20 from the housing.

Hinged side plates 52 (FIGS. 2, 4, 6 and 8) are provided to open or close the wall apertures 51. The side plates are hinged at their longitudinal center on a yieldable rod 53 through a lug 54 on the plates, the rods being secured at the ends to lugs 55 on the capping plate 39. As will be seen, the outer edge of the plates is formed with a right angled rib which overlappingly engage side flanges 56 on frame 19 when the plates are in closed position. This together with abutment of lugs 54 against the underside of tabs 57 on plate 39, as shown, positively secures frame 19 to the housing. Detent notches 58 and 59 in the lugs 54 (best shown in FIG. 8) engage with a projection on plate 39 to sustain the side plates in their open and closed positions, the rod 53 spring biasing such engagement.

Figure 11:
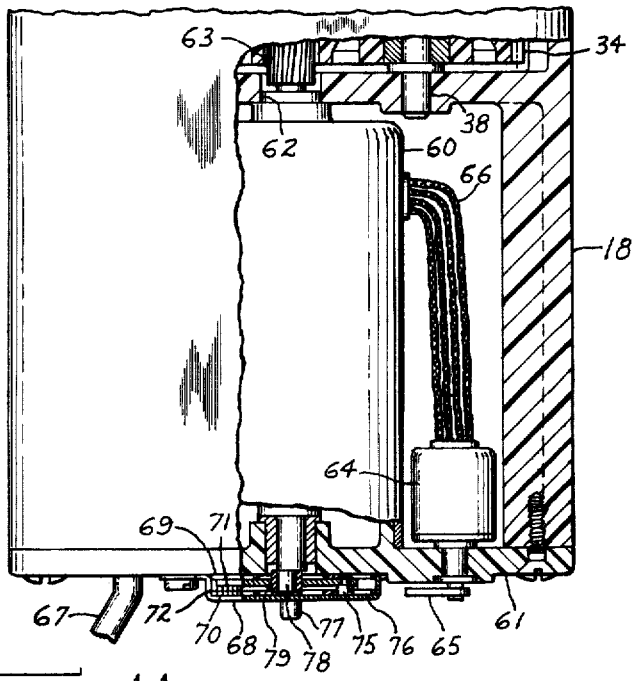
FIG. 11 is a vertical side elevation of the lower portion of the shaver with a portion broken away to show the driving member, reversing switch, and a partial transverse section of the hair trimming clipper.
Figure 13:
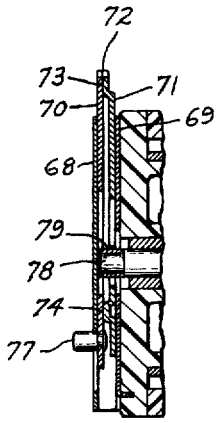
FIG. 13 is a longitudinal sectional view taken on line 13—13 of FIG. 12 still further showing the structure of the trimming cutter.
Figure 12:
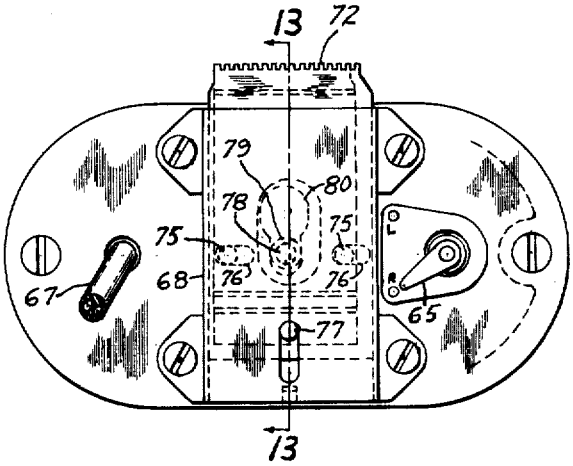
FIG. 12 is a bottom plan view further showing in broken lines the structure of the hair trimming clipper, and the reversing switch lever.

Referring now to FIGS. 11, 12 and 13, a reversible electric motor 60 is provided and supported at its lower end, as shown, on a housing bottom cover plate 61 suitably secured to the housing. The upper end of the motor may be piloted, as at 62, in an orifice in the housing partition. A helical driving pinion 63 on the motor shaft upper end is meshed with gears 34.

A motor reversing switch 64 is secured to cover plate 61 by a stem portion extending through the cover plate. Affixed to a shaft projecting from the stem is a switching lever 65 movable to positions designated "L" and "R" for manually reversing the driving rotation when desired. Four conductor wires, generally designated 66, lead from the motor to the switch to effect reversal in conventional manner. 67 designates a cord from the motor to be connected to a power source.

Suitably affixed to the cover plate 61 is a reciprocally operated toothed edge hair trimming clipper comprising a retaining housing 68, a base slide bearing plate 69, a stationary shear plate 70, and a reciprocal shear plate 71, The plates 70 and 71 are provided with corresponding and cooperating shear teeth 72. Plate 71 is in contact with plate 70 at only two points 73 and 74, as shown, and plate 69 may be slightly bowed before assembly to bias the shearing plates together to sustain the teeth in effective shearing contact.

Plate 71 is constrained to reciprocate in a straight line by guide studs 75 affixed thereto, which, as shown in broken lines in FIG. 12, are fittingly engaged in elongated apertures 76 in plate 70. To project or retract the toothed edges the two shear plates may be moved back and forth in unison by a stud 77 affixed to plate 70 and protruding through a slot in retaining housing 68.

The motor shaft terminates with an eccentric portion 78 fitted with a roller sleeve 79 which, as shown in broken lines in FIG. 12, is fittingly engaged in the narrow portion of a two-width aperture 80 in plate 71. In the position thus shown and described the reciprocal plate will be operable by the eccentric 78, but when the plates are retracted by means of the stud 77 the eccentric will be disposed in the wider portion of the aperture 80 and thereby rendered inoperative.

It is proposed to make the housing 18, components 39 and 61, and gears 34 of a suitable plastic.

While in the present disclosure the shaver is shown and described with the motor driven from a remote power source it could as well be constructed to comprise and be operated by a battery, rechargeable or otherwise. Also, while herein the rotation reversing is shown and described as effected by a reversible motor it is obvious that the shaver could be so constructed that reversal could instead be effected by a gear or clutch shifting system. Further, to simplify drawings and specification the shaver is shown with only two cutting element assemblies whereas it is anticipated that several may be employed, all driven from a common power source. I do not exclude the foregoing modifications from the scope of my invention.

OPERATION

With the shaver in operation, and the cutting blades rotating in either direction, the shear plates will be pressed against the skin, and irrespective of the contour of the skin being shaved the shear plates will tilt to conform and hair from all contact points will enter the apertures and be sheared off. Also, irrespective of the amount of pressure applied in shaving the free tilting of the plates will remain effective. In other words, they cannot be depressed to rest untiltably flat on a secondary supporting surface. Moreover, though the plates remain tiltable under all conditions no shaving or handling pressure is taken on the rotary cutting blades, and as the spherical tilt center of the cutting blades coincide even the spring pressure biasing the blades into contact with the shear plates does not vary. Thus, with no changing pressures tending to make the blades break through, the thickness of the cutting portion of the shear plates can be reduced to a desired minimum to effect the closest shaving.

The cutting blades may be allowed to run in one direction until the cutting edges on one side become dull, or they may be reversed frequently to aid in eliminating hair dust and other debris from the cutting elements. Reversing requires only the moving of switch lever 65 from one position to the other.

The hair trimming clipper is for trimming hair edges, mustaches, beard contours, etc. As hereinbefore stated, for use the toothed edge may be projected from the housing by the stud 77, wherewith the motor shaft eccentric becomes engaged in the narrow fitting portion of aperture 80 in the reciprocal plate making it operative. The clipper cuts by placing the ends of the teeth against the skin at the line to be trimmed. When not in use the toothed edge may be retracted into the housing, which disconnects the drive to save wear and to keep it from accidently contacting and perhaps damaging or being damaged by some object.

What I claim is:

1. In a rotary dry shaver, a component housing, a *universally* tiltable *nonrotating* cutting element comprising [a flanged apertured shear plate exposedly retained in the housing by said flange positioned under an apertured frame,] *an apertured shear plate provided with a radially extended flange, the flange positioned under an apertured frame affixed to the housing, the cutting element exposedly retained by and in said frame by said flange,* a rotary cutting member cooperative with the shear plate and coactively tiltable therewith, a driving shaft for the cutting member, means to bias the cutting member into contact with the shear plate, and the said cutting element [tiltably supported axially by means separate from the cutting member and its biasing means] *supported in the axial direction and universally tiltable on a single supporting element separate from the cutting member and its biasing means and the means tiltably connecting the driving shaft to the cutting member.*

2. The structure defined in claim 1, wherein the said means by which the cutting element is tiltably supported comprises a spherically radiused supporting surface.

3. The structure defined in claim 1, wherein the said cutting element is substantially cup-shaped, and a portion of the inner surface thereof spherically radiused and tiltably seated on the supporting means.

4. The structure defined in claim 1, including a cutting element retaining frame provided with an aperture through which a portion of the said element projects, the element having an outer surface a portion of which is spherically radiused and fittingly and tiltably retained by and in the frame aperture.

5. The structure as defined in claim 3 wherein the driving shaft is connected at one end to the cutting member at a point concentric with the spherical center of the said spherically radiused surface on which the cutting element is supported, the cutting member being universally tiltable on the shaft.

6. The structure define in claim 1 including means by which the rotation of the cutting member may be reversed at desired intervals to cut in an opposite direction.

*7. In a dry shaver including a housing, at least one cutter guard and a cooperating cutter that is rotatable about its axis, a holder in which said guard is movably mounted, the first spring means for resiliently urging said cutter axially upward (when said shaver is upright) into engagement with said guard which is thereby urged upward in engagement with said mount, the improvement in combination therewith wherein said holder includes a circular aperture defined by a rim having first diameter, said guard has an outer surface which is spherically curved, has diameter corresponding to said first diameter, and is situated within and engaging said rim, said spherical surface having its center situated substantially on said cutter axis, said guard*

*and cutter together being both pivotable in said rim and depressible axially downward against said first spring means.*

*8. A shaver according to claim 7, wherein said cutter guard has a hat shape with an upper part perforated at the top thereof, and a lower part with an open bottom which faces said cutter, and wherein said center B of said spherical surface is situated in said mount below said lower part of the guard.*

*9. Apparatus according to claim 7, further comprising holding means carried by said guard for preventing said guard from moving axially upward and out of engagement with said mount.*

*10. Apparatus according to claim 7, further comprising first bearing member spring-mounted on said housing and supporting said guard.*

*11. Apparatus according to claim 7, wherein said holder is axially movable relative to said housing, said holder being urged resiliently upward by force from contact with said guard, said apparatus further comprising spring means mounted on said housing and resiliently urging said holder downward.*

*12. Apparatus according to claim 11, wherein said holder is an annular ring the bore of which defines said rim engaging said spherical surface of said guard.*

* * * * *